(12) United States Patent
Anderson et al.

(10) Patent No.: US 6,706,223 B1
(45) Date of Patent: Mar. 16, 2004

(54) MICROCELLUAR EXTRUSION/BLOW MOLDING PROCESS AND ARTICLE MADE THEREBY

(75) Inventors: Jere R. Anderson, Newburyport, MA (US); Richard S. Straff, Marblehead, MA (US); Kelvin T. Okamoto, Boston, MA (US); Kent Blizard, Ashland, MA (US); David E. Pierick, Georgetown, MA (US)

(73) Assignee: Trexel, Inc., Woburn, MA (US)

( * ) Notice: Subject to any disclaimer, the term of this patent is extended or adjusted under 35 U.S.C. 154(b) by 96 days.

(21) Appl. No.: 09/689,320

(22) Filed: Oct. 12, 2000

Related U.S. Application Data

(60) Division of application No. 09/241,352, filed on Feb. 2, 1999, now abandoned, which is a continuation-in-part of application No. PCT/US98/27118, filed on Dec. 18, 1998.
(60) Provisional application No. 60/107,754, filed on Nov. 10, 1998, and provisional application No. 60/068,173, filed on Dec. 19, 1997.

(51) Int. Cl.[7] .......................... B29C 44/02; B29C 49/04

(52) U.S. Cl. .......................... 264/51; 264/540; 264/541

(58) Field of Search .......................... 264/51, 540, 541

(56) References Cited

U.S. PATENT DOCUMENTS

| | | |
|---|---|---|
| 3,225,127 A | 12/1965 | Scott, Jr. |
| 3,227,664 A | 1/1966 | Blades et al. |
| 3,227,784 A | 1/1966 | Blades et al. |
| 3,277,221 A | 10/1966 | Parrish |
| 3,375,211 A | 3/1968 | Parrish |
| 3,375,212 A | 3/1968 | Bonner, Jr. |

(List continued on next page.)

FOREIGN PATENT DOCUMENTS

| | | |
|---|---|---|
| EP | 0707935 A2 | 4/1996 |
| EP | 0799853 | 10/1997 |
| EP | 0818292 A2 | 1/1998 |
| GB | 1 456 171 | 11/1976 |
| WO | WO 89/00918 A2 | 2/1989 |
| WO | WO 90/07546 A1 | 7/1990 |
| WO | WO 95/24440 A1 | 9/1995 |
| WO | WO 97/28050 A1 | 8/1997 |
| WO | WO 98/08667 A2 | 3/1998 |
| WO | WO 98/31521 A2 | 7/1998 |

OTHER PUBLICATIONS

D.F. Baldwin et al., "A processing system for the extrusion of microcellular polymer sheets: shaping and cell growth Control", *Cellular and Microcellular Materials*, Nov. 1994, MD–vol. 53, pp. 95–107 (ASME 1994).

C. Park et al., "Effect of the pressure drop rate on cell nucleation in continuous processing of microcellular polymers" *Polymer Engineering and Science*, Mar. 1995, vol. 35, No. 5, pp. 432–440.

C. Park et al., "Filamentary extrusion of microcellular poylmers using a rapid decompressive element", *Polymer Engineering & Science*, Jan. 1996, vol. 36, No. 1, pp. 34–48, XP000583331, see page 42, column 2 —p. 46.

*Primary Examiner*—Leo B. Tentoni
(74) *Attorney, Agent, or Firm*—Wolf, Greenfield & Sacks, P.C.

(57) ABSTRACT

A microcellular injection blow molding system and method, and microcellular blow molded articles produced thereby, are described. The system is equipped to extrude microcellular material that changes in thickness, material density, or both in the machine direction while maintaining a constant pressure drop rate during nucleation just prior to extrusion, providing the ability to produce consistent uniform microcellular material independent of material thickness. The systems and methods are particularly useful in production of strong, thin-walled, non-liquid-permeable, opaque containers that do not contain reinforcing agent, chromophore, or residue of chemical blowing agent or chemical blowing agent by-product.

54 Claims, 5 Drawing Sheets

U.S. PATENT DOCUMENTS

| | | |
|---|---|---|
| 3,384,531 A | 5/1968 | Parrish |
| 3,491,032 A | 1/1970 | Skochdopole et al. |
| 3,584,090 A | 6/1971 | Parrish |
| 3,637,458 A | 1/1972 | Parrish |
| 3,787,543 A | 1/1974 | Parrish |
| 3,812,225 A | 5/1974 | Hosoda et al. |
| 3,939,236 A | 2/1976 | Hahn .......................... 264/53 |
| 4,244,897 A * | 1/1981 | Moon ......................... 264/411 |
| 4,264,672 A | 4/1981 | Taylor-Brown et al. |
| 4,444,702 A | 4/1984 | Thomas et al. |
| 4,473,665 A | 9/1984 | Martini-Vvedensky et al. |
| 4,627,177 A | 12/1986 | Meyers |
| 4,761,256 A | 8/1988 | Hardenbrook et al. |
| 4,791,144 A | 12/1988 | Nagou et al. |
| 4,832,770 A | 5/1989 | Nojiri et al. |
| 4,874,649 A | 10/1989 | Daubenbüchel et al. |
| 5,034,171 A | 7/1991 | Kiczek et al. |
| 5,110,998 A | 5/1992 | Muschiatti |
| 5,116,881 A | 5/1992 | Park et al. |
| 5,128,382 A | 7/1992 | Elliott, Jr. et al. |
| 5,149,579 A | 9/1992 | Park et al. |
| 5,158,986 A | 10/1992 | Cha et al. |
| 5,160,674 A | 11/1992 | Colton et al. |
| 5,180,751 A | 1/1993 | Park et al. |
| 5,182,307 A | 1/1993 | Kumar |
| 5,334,356 A | 8/1994 | Baldwin et al. |
| 5,358,675 A | 10/1994 | Campbell et al. |
| 5,468,530 A | 11/1995 | Gotz et al. |
| 5,500,450 A | 3/1996 | Simandl et al. |
| 5,527,573 A | 6/1996 | Park et al. |
| 5,571,848 A | 11/1996 | Mortensen et al. |
| 5,670,102 A | 9/1997 | Perman et al. |
| 5,684,055 A | 11/1997 | Kumar et al. |
| 5,830,393 A | 11/1998 | Nishikawa et al. |
| 5,844,009 A | 12/1998 | Hurley et al. |
| 5,866,053 A | 2/1999 | Park et al. |
| 5,883,144 A | 3/1999 | Bambara et al. |
| 5,883,145 A | 3/1999 | Hurley et al. |
| 5,904,965 A | 5/1999 | Noel et al. |
| 5,955,511 A | 9/1999 | Handa et al. |
| 6,284,810 B1 * | 9/2001 | Burnham et al. .............. 521/79 |
| 6,376,059 B1 * | 4/2002 | Anderson et al. ......... 428/314.8 |

* cited by examiner

MICROCELLUAR EXTRUSION/BLOW MOLDING PROCESS AND ARTICLE MADE THEREBY

RELATED APPLICATIONS

This application is a divisional of U.S. patent application Ser. No. 09/241,352, filed Feb. 2, 1999 now abandoned, which is a continuation-in-part of PCT application serial no. PCT/US98/27118, filed Dec. 18, 1998, which is a continuation-in-part of U.S. patent application Ser. No. 60/107,754 filed Nov. 10, 1998 and a continuation-in-part of U.S. patent application Ser. No. 60/068,173 filed Dec. 19, 1997.

FIELD OF THE INVENTION

The present invention relates generally to extrusion blow molding, and more particularly to a technique for extrusion blow molding of microcellular polymeric material.

BACKGROUND OF THE INVENTION

Polymeric extrusion blow molding is a known process in which a molten polymeric material is extruded from an extruder die as a parison (an essentially cylindrical polymeric sleeve). The parison is placed in a mold and, typically while still warm enough to be soft and moldable, is subjected to significant gas pressure internal of the cylinder and expanded against the mold. Many common articles such as beverage bottles, motor oil bottles, pharmaceutical packaging, cosmetic packaging, and the like are manufactured using this technique.

In many cases, a parison is extruded so as to have differing thickness along its length. Thicker portions may correspond to locations where the article needs to be reinforced to a relatively greater extent, or to provide for expansion in some regions to a greater extent than in other regions (in the blow-molding formation of, for example, a plastic detergent bottle), while maintaining an essentially constant thickness in the molded article.

Foamed polymeric materials are well known, and can be produced by introducing a physical blowing agent into a molten polymeric stream, mixing the blowing agent with the polymer, and extruding the mixture into the atmosphere while shaping the mixture. Exposure to atmospheric conditions causes the blowing agent to gasify, thereby forming cells in the polymer. Alternatively, a chemical blowing agent can be added and caused to react in the molten polymeric stream, resulting in the generation of gas that forms cells in the polymer. In both cases, nucleating agents are normally used to control cell size and uniformity.

U.S. Pat. No. 4,444,702 (Thomas, et al.) describes a system for producing tubular extruded parisons of thermoplastic material, the wall thickness of the extruded parison being varied during extrusion.

U.S. Pat. No. 3,939,236 (Hahn) describes a technique involving extruding a cellular polymeric tubular parison, then blow molding the parison.

U.S. Pat. No. 3,225,127 (Scott) describes a process involving extruding molten plastic containing a foaming agent through an annular orifice to form a foamed parison, then placing the parison in a blow mold cavity and expanding the parison within the mold.

U.S. Pat. No. 4,874,649 (Daubenbüchel, et al.) states that major difficulties exist in extrusion blow molding of foam articles in which a preform that has already been foamed is expanded. Daubenbüchel, et al. state that foamed material of a preform that is still in a thermoplastic condition has regions that exhibit different strength and expandability values over the length and periphery of the preform, with the result that weak points are formed under the effect of internal pressure within the preform, and that in many circumstances these weak points cause the wall of the preform or the molded article produced therefrom to tear open, giving rise to wastage. Daubenbüchel, et al. purportedly solve this problem by co-extruding a multi-layer thermoplastic preform in which at least one layer is non-foamable. Using a non-foamable layer purportedly allows the preform to be expanded, after the material has been foamed, without giving rise to the danger of forming weak points or holes through the wall of the article. When the layer of non-foamable material is arranged on the outside of the article, an article is produced having a smooth exterior surface. Daubenbüchel, et al. also describe blow-molding expansion of the preforms at a pressure on the order of 1 bar, or less than around 0.5 bar, which they characterize as markedly lower than in the case of conventional extrusion blowing process, to avoid bubbles or pores in the foamed material from being compressed.

While processes for the extrusion blow molding of foamed polymeric material are known, a need exists for simplified processes for production of extruded blow-molded products having good physical qualities. It is an object of the invention, therefore, to provide extrusion blow-molded foam articles of good physical properties, and techniques for producing these articles. It is another object to provide relatively thin-walled extruded, blow-molded foam articles and techniques for producing these articles that involve controlling foam uniformity and density.

SUMMARY OF THE INVENTION

The present invention provides a series of articles, systems, devices, and methods associated with foam, blow-molded articles.

In one aspect, the invention provides an article. In one embodiment, an article is provided comprising a blow-molded, foam, microcellular, polymeric article.

In another embodiment, the invention provides an extruded, microcellular parison suitable for blow-molding.

In another aspect, the invention provides systems. One system includes extrusion apparatus having an extruder with an inlet designed to receive a precursor of polymeric microcellular material, constructed and arranged to provide a single-phase, non-nucleated solution of polymeric material and a blowing agent. A blow-molding forming die is fluidly connected to the extruder and has an outlet designed to release a parison of microcellular material. The apparatus includes an enclosed passageway connecting the extruder inlet to a blow molding forming die outlet. The passageway includes a nucleating pathway having length and cross-sectional dimensions selected to create, in a single-phase, non-nucleated solution of blowing agent and fluid polymeric material, a pressure drop at a rate sufficient to cause microcellular nucleation. A blow mold also is included, and is positionable to receive a parison of microcellular material from the die outlet.

In another embodiment, a system is provided that includes an extruder constructed and arranged to provide a polymeric foam precursor material, and an accumulator associated with the extruder. The accumulator is able to receive polymeric foam precursor material from the extruder and to accumulate a charge of polymeric foam precursor material. Blow molding apparatus also is provided in this system, and is positionable to receive a product of the accumulator, via a forming die. The blow molding apparatus is constructed and arranged to blow mold the material to form a blow-molded foam polymeric article.

In another embodiment a system that includes a combination of some aspects described above as provided. The system includes an extruder having an inlet to receive a precursor of polymeric microcellular material that is constructed and arranged to provide a single-phase non-nucleated solution of polymeric material and a blowing agent. An accumulator is provided and is positionable to receive polymeric foam precursor material from the extruder and to accumulate a charge of the polymeric foam precursor material. A blow-molding forming die is fluidly connected to the accumulator and has an outlet designed to release a parison of microcellular material. A blow mold is positionable to receive a parison of microcellular material from the die outlet and is constructed and arranged to form a blow-molded, foam, microcellular, polymeric article. The apparatus includes an enclosed passageway connecting the extruder inlet with the die outlet, the passageway including a nucleating pathway defined above.

In another aspect, the invention provides a forming die device. The die includes an inlet at an upstream end constructed and arranged to receive a single-phase, homogeneous solution of polymeric material and a blowing agent that is a gas under ambient conditions, and an outlet at a downstream end thereof, defining a die gap, for releasing foamed polymeric material. A fluid pathway connects the inlet with the outlet and includes a nucleating pathway. The die is constructed and arranged to vary the width of the die gap during extrusion while maintaining a constant nucleating pathway gap.

In another aspect, the invention provides a series of methods. In one embodiment, a method is provided that involves extruding polymeric foam extrudate from an extruder die while varying the thickness of the extrudate.

In another embodiment, a method is provided that includes providing an extrudate polymeric microcellular foam parison and subjecting the parison to blow molding conditions.

In another embodiment, a method is provided that involves extruding a polymeric foam extrudate from an extruder die in a machine direction while varying the temperature of the extrudate exiting the die. An extrudate thereby is formed having a first portion and a second portion spaced from the first portion in the machine direction, the first portion and second portion differing in material density by a factor of at least 1.1.

In another embodiment, a method is provided that involves subjecting a foam polymeric parison to relatively severe blow-molding conditions while maintaining relatively constant density in the parison. A parison can be subjected to blow-molding conditions of at least about 15 psi thereby expanding at least a portion of the parison at least about 50% in circumference. This takes place while the density of the parison remains relatively constant, in particular the density is increased by no more than about 20%.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION OF THE INVENTION

Figure 1:
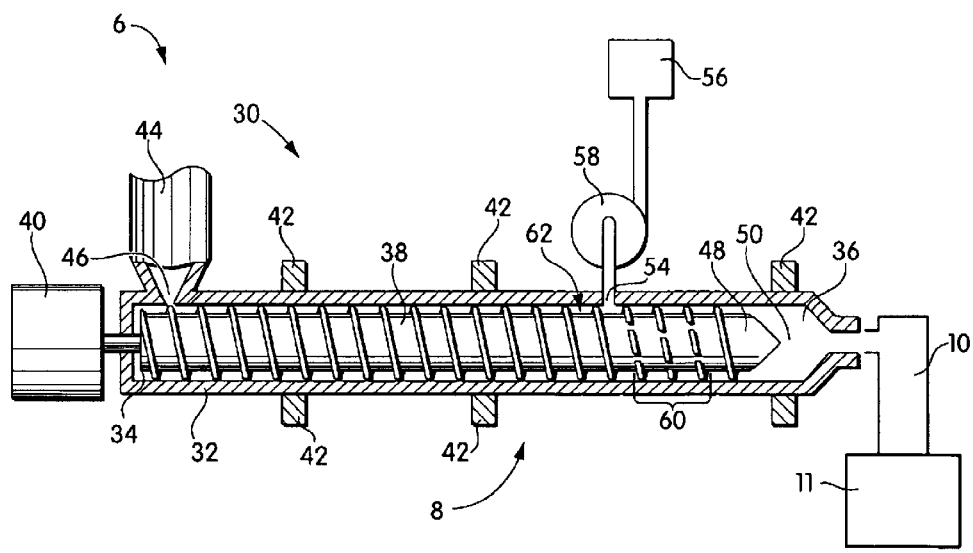
FIG. 1 is a schematic illustration of an injection blow molding system of the invention.

Commonly-owned, co-pending U.S. patent application Ser. No. 08/777,709 "Method and Apparatus for Microcellular Polymer Extrusion", filed Dec. 20, 1996, commonly-owned co-pending International patent application serial no. PCT/US98/27118, filed Dec. 18, 1998, and commonly-owned, co-pending International patent application serial no. PCT/US97/15088, filed Aug. 26, 1997 are incorporated herein by reference.

The various embodiments and aspects of the invention will be better understood from the following definitions. As used herein, "nucleation" defines a process by which a homogeneous, single-phase solution of polymeric material, in which is dissolved molecules of a species that is a gas under ambient conditions, undergoes formations of clusters of molecules of the species that define "nucleation sites", from which cells will grow. That is, "nucleation" means a change from a homogeneous, single-phase solution to a mixture in which sites of aggregation of at least several molecules of blowing agent are formed. Nucleation defines that transitory state when gas, in solution in a polymer melt, comes out of solution to form a suspension of bubbles within the polymer melt. Generally this transition state is forced to occur by changing the solubility of the polymer melt from a state of sufficient solubility to contain a certain quantity of gas in solution to a state of insufficient solubility to contain that same quantity of gas in solution. Nucleation can be effected by subjecting the homogeneous, single-phase solution to rapid thermodynamic instability, such as rapid temperature change, rapid pressure drop, or both. Rapid pressure drop can be created using a nucleating pathway, defined below. Rapid temperature change can be created using a heated portion of an extruder, a hot glycerine bath, or the like. A "nucleating agent" is a dispersed agent, such as talc or other filler particles, added to a polymer and able to promote formation of nucleation sites from a single-phase, homogeneous solution. Thus "nucleation sites" do not define locations, within a polymer, at which nucleating agent particles reside. "Nucleated" refers to a state of a fluid polymeric material that had contained a single-phase, homogeneous solution including a dissolved species that is a gas under ambient conditions, following an event (typically thermodynamic instability) leading to the formation of nucleation sites. "Non-nucleated" refers to a state defined by a homogeneous, single-phase solution of polymeric material and dissolved species that is a gas under ambient conditions, absent nucleation sites. A "non-nucleated" material can include nucleating agent such as talc. A "polymeric material/ blowing agent mixture" can be a single-phase, non-nucleated solution of at least the two, a nucleated solution of at least the two, or a mixture in which blowing agent cells have grown. "Essentially closed-cell" microcellular material is meant to define material that, at a thickness of about 100 microns, contains no connected cell pathway through the material. "Nucleating pathway" is meant to define a pathway that forms part of microcellular polymeric foam extrusion apparatus and in which, under conditions in which the apparatus is designed to operate (typically at pressures of from about 1500 to about 30,000 psi upstream of the nucleator and at flow rates of greater than about 10 pounds polymeric material per hour), the pressure of a single-phase solution of polymeric material admixed with blowing agent in the system drops below the saturation pressure for the particular blowing agent concentration at a rate or rates facilitating rapid nucleation. A nucleating pathway defines, optionally with other nucleating pathways, a nucleation or nucleating region of a device of the invention. "Reinforcing agent", as used herein, refers to auxiliary, essentially solid material constructed and arranged to add dimensional stability, or strength or toughness, to material. Such agents are typified by fibrous material as described in U.S. Pat. Nos. 4,643,940 and 4,426,470. "Reinforcing agent" does not, by definition, necessarily include filler or other additives that are not constructed and arranged to add dimensional stability. Those of ordinary skill in the art can test an additive to determine whether it is a reinforcing agent in connection with a particular material.

In preferred embodiments, microcellular material of the invention is produced having average cell size of less than about 50 microns. In some embodiments particularly small cell size is desired, and in these embodiments material of the invention has average cell size of less than about 30 microns, more preferably less than about 20 microns, more preferably less than about 10 microns, and more preferably still less than about 5 microns. The microcellular material preferably has a maximum cell size of about 100 microns or preferably less than about 75 microns. In embodiments where particularly small cell size is desired, the material can have maximum cell size of about 50 microns, more preferably about 35 microns, and more preferably still about 25 microns. A set of embodiments includes all combinations of these noted average cell sizes and maximum cell sizes. For example, one embodiment in this set of embodiments includes microcellular material having an average cell size of less than about 30 microns with a maximum cell size of about 50 microns, and as another example an average cell size of less than about 30 microns with a maximum cell size of about 35 microns, etc. That is, microcellular material designed for a variety of purposes can be produced having a particular combination of average cell size and a maximum cell size preferable for that purpose. Control of cell size is described in greater detail below.

The present invention provides systems and techniques for extrusion blow molding of microcellular and other polymeric foam material, and microcellular parisons suitable for blow molding, that is, parisons that can be subjected to blow molding conditions as described herein to produce articles as described herein. In particular, the invention provides techniques for production of lightweight, strong microcellular articles that can be blow molded to form microcellular polymeric blow molded parisons that can have particularly thin walls. It is a feature that articles of the invention can be produced that are free of a non-foam, structurally-supporting material positioned to support the foam article. This means that where a plastic bottle, for example, is produced, the walls of the bottle can be composed entirely of the microcellular foam material, without an auxiliary layer of solid supporting plastic.

The invention involves the discovery that microcellular material overcomes problems associated with certain prior art techniques, in particular, problems in blow molding associated with the inherent relative weakness of conventional thermoplastic polymer foams. Microcellular material of the present invention surprisingly can be blow molded at relatively high pressures, in particular a pressure of at least about 1.5 bar internal of a microcellular parison, in some cases at least about 2.5 bar, in some cases at least about 5 bar, in some cases at least about 7 bar, and in some cases still at least about 10 bar internal of the parison. This strength is achieved even in microcellular parisons including at least some portion having a void volume of at least about 5%, preferably at least about 10%, preferably at least about 20%, more preferably at least about 30%, and in some cases as high as at least about 50% or at least about 70%, even without reinforcing agents, and while forming final microcellular foam products having thin walls, in particular at thicknesses described below. In this regard, microcellular blow molded articles are produced having less than about 10% reinforcing agent by weight, more preferably less than about 5% reinforcing agent, more preferably still less than about 2%, and in particularly preferred embodiments the articles of the invention are essentially free of reinforcing agent.

It also has been surprisingly found that microcellular foam parisons of the invention can be blow molded under relatively severe conditions without a significant change in density in the material. Specifically, a foam parison of the invention can be subjected to blow-molding conditions of at least about 15 psi, or 18 or 20 psi or other pressures described above, thereby expanding at least a portion of the parison by at least about 50% and forming a blow-molded article while maintaining a relatively constant density in the material, specifically, increasing the density of the parison by no more than about 20% in going from the parison to the blow-molded article. In preferred embodiments at least a portion of the parison is expanded by at least about 75%, 100%, 150%, 200%, 300%, or at least about 400% in circumference while the density of the parison is increased by no more than about 15%, 10%, 8%, 5% or preferably 3%.

Without wishing to be bound by any theory, it is believed that the microcellular material of the invention is particularly suitable to the relatively harsh conditions of blow molding because the cells of the invention, of very small size, are not easily crushed or otherwise distorted. It is believed that as the size of the cells decreases, the force required to cause collapse of an individual cell significantly increases.

The die of the invention can be shaped and controlled to produce blow-molded articles that have sections with differing thicknesses and sections with differing void volume. For example, a blow-molded, square-shaped bottle can be formed that has sections defining its corners that are thicker than remaining portions of the bottle wall. The thicker portions can, e.g., have a void volume of 50% and the thinner wall a void volume of about 10%. These thicker regions are reinforcing regions. Reinforcing regions also can be provided at corners that define the boundary between the bottle wall and the bottle bottom, or the bottle wall and bottle top, or vertical corners, or all of these.

It is a feature of the present invention that strong, thin-walled articles can be produced that are opaque without the use of opacifiers. This is because polymeric foam diffracts light, thus it is essentially opaque and has a white appearance. It is a feature of the invention that microcellular foams are more opaque, and uniformly so, than conventional foams. This is a significant advantage in connection with articles constructed and arranged to contain material that is subject to destruction upon exposure to light, such as food containers. Such material can involve food consumable by animals such as humans, containing vitamins that can be destroyed upon exposure to light. In a preferred embodiment the invention provides microcellular blow-molded milk containers, as it is particularly known that vitamins in milk can be lost upon exposure to fluorescent light. Milk bottle container producers are reported to introduce pigments into milk bottles, typically high density polyethylene milk bottles, so as to protect milk from vitamin-destroying light. However, pigmented polymeric material is less amenable to recycling. The present invention provides, in one embodiment, thin, opaque, blow-molded containers that include less than about 1% by weight auxiliary opacifer, preferably less than about 0.05% by weight auxiliary opacifer, and more preferably still material that is essentially free of auxiliary opacifer. "Auxiliary opacifer", in the present invention, is meant to define pigments, dies, or other species that are designed specifically to absorb light, or talc or other materials that can block or diffract light. Those of ordinary skill in the art can test whether an additive is an opacifer. Microcellular blow molded articles of the invention have the appearance of essentially solid, white, plastic articles, which offers significant commercial appeal.

Material of the present invention is, in preferred embodiments, blown with a physical blowing agent such as an atmospheric gas, in particular carbon dioxide, and thus in this embodiment does not require the added expense and complication of formulating a polymeric precursor to include a chemical blowing agent, that is, a species that will react under extrusion conditions to form a blowing agent. Since foams blown with chemical blowing agents inherently include a residual, unreacted chemical blowing agent after a final foam product has been produced, as well as chemical by-products of the reaction that forms a blowing agent, material of the present invention in this set of embodiments includes residual chemical blowing agent, or reaction by-product of chemical blowing agent, in an amount less than that inherently found in articles blown with 0.1% by weight chemical blowing agent or more, preferably in an amount less than that inherently found in articles blown with 0.05% by weight chemical blowing agent or more. In particularly preferred embodiments, the material is characterized by being essentially free of residual chemical blowing agent or free of reaction by-products of chemical blowing agent. That is, they include less residual chemical blowing agent or by-product that is inherently found in articles blown with any chemical blowing agent.

One advantage of embodiments in which a chemical blowing agent is not used or used in very minute quantities is that recyclability of product is maximized. Use of a chemical blowing agent typically reduces the attractiveness of a polymer to recycling since residual chemical blowing agent and blowing agent by-products contribute to non-uniformity in the recyclable material pool.

As mentioned, the present invention provides for blow-molding of relatively high void-volume articles having thin walls, in some embodiments. In particular, the articles of the invention have a wall thickness less than about 0.100 inch, more preferably less than about 0.075 inch, more preferably less than about 0.050 inch, more preferably still less than about 0.040 inch, and in some cases as low as 0.025 inch, 0.015 inch, or 0.010 inch or less.

In one set of embodiments the invention represents the solution of problems associated with the extrusion of polymeric foam parisons having a variety of conventional cell sizes, in addition to microcellular parisons, for blow molding, that must be varied in thickness or density. In this set of embodiments the invention provides techniques for producing a polymeric foam parison, which can be microcellular, that varies in thickness, and/or varies in material density, along its length. Specifically, the preferred extruded polymeric foam parison has a first portion and a second portion spaced from the first portion in the parison machine direction, the first portion and the second portion differing in thickness by a factor of at least about 1.1. In other embodiments the first and second portions differ in thickness by factors of at least about 1.3, 1.5, or 1.7. The first and second portions can differ in material density by a factor of at least about 1.1, and in other embodiments by a factor of at least about 1.3, 1.5, or 1.7. The parison is suitable for blow-molding to produce an article including a first portion expanded to a first extent and a second portion expanded at least 1.5 times the first extent, the first and second portions, after expansion, differing in each of thickness, material density, and cellular density by no more than about 5%. In this technique, a polymeric extrusion die is provided that is constructed and arranged to subject a flowing, single-phase solution of molten polymeric material and physical blowing agent that is a gas under atmospheric conditions to a consistent pressure drop rate while varying the annular gap at the die exit to facilitate production of a microcellular polymeric foam parison that varies in thickness along its length. The die is effective in this task by providing the physical separation of nucleation from shaping. That is, nucleation occurs in a consistent manner (an essentially constant pressure drop rate) upstream of shaping, thus differential shaping does not effect cell size, cell density, or material density, substantially. Alternatively or in addition, the parison can be subjected, during extrusion, to differing temperature resulting in differential material density as a function of position in the machine direction.

Referring now to FIG. 1, an extrusion blow molding system 6 of the present invention is illustrated schematically. System 6 includes an extruder 8 fluidly connected to a blow-molding extrusion die 10, and a blow mold 11 positionable to receive a parison of microcellular material from the outlet of the die. Blow mold 11 can be a conventional mold, and is not described in detail here except to say that foam parisons of the invention can be blow molded without heating, thus mold 11 need not include auxiliary heating systems. That is, a foam parison of the invention, preferably a microcellular foam parison, can be extruded and then blow molded in mold 11 without applying heat to the parison in the mold. Extruder 8 includes a barrel 32 having a first, upstream end 34, and a second, downstream end 36 connected to die 10. Mounted for rotation within barrel 32 is a screw 38 operably connected, at its upstream end, to a drive motor 40. Although not shown in detail, screw 38 includes feed, transition, gas injection, mixing, and metering sections.

Positioned along barrel 32, optionally, are temperature control units 42. Control units 42 can be electrical heaters, can include passageways for temperature control fluid, and or the like. Units 42 can be used to heat a stream of pelletized or fluid polymeric material within the barrel to facilitate melting, and/or to cool the stream to control viscosity and, in some cases, blowing agent solubility. The temperature control units can operate differently at different locations along the barrel, that is, to heat at one or more locations, and to cool at one or more different locations. Any number of temperature control units can be provided.

Barrel 32 is constructed and arranged to receive a precursor of polymeric material. As used herein, "precursor of polymeric material" is meant to include all materials that are fluid, or can form a fluid and that subsequently can harden to form a microcellular polymeric article. Typically, the precursor is defined by thermoplastic polymer pellets, but can include other species. For example, in one embodiment the precursor can be defined by species that will react to form microcellular polymeric material as described, under a variety of conditions. The invention is meant to embrace production of microcellular material from any combination of species that together can react to form a polymer, typically monomers or low-molecular-weight polymeric precursors which are mixed and foamed as the reaction takes place. Preferably, a thermoplastic polymer or combination of thermoplastic polymers is selected from among amorphous, semicrystalline, and crystalline material including polyaromatics such as styrenic polymers including polystyrene, polyolefins such as polyethylene and polypropylene, fluoropolymers, crosslinkable polyolefins, and polyamides.

Typically, introduction of the pre-polymeric precursor utilizes a standard hopper 44 for containing pelletized polymeric material to be fed into the extruder barrel through orifice 46, although a precursor can be a fluid prepolymeric material injected through an orifice and polymerized within the barrel via, for example, auxiliary polymerization agents. In connection with the present invention, it is important only that a fluid stream of polymeric material be established in the system.

Immediately downstream of the downstream end 48 of screw 38 in FIG. 1 is a region 50 which can be a temperature adjustment and control region, auxiliary mixing region, auxiliary pumping region, or the like. For example, region 50 can include temperature control units to adjust the temperature of a fluid polymeric stream prior to nucleation, as described below. Region 50 can include instead, or in addition, additional, standard mixing units (not shown), or a flow-control unit such as a gear pump (not shown). In another embodiment, region 50 can be replaced by a second screw in tandem which can include a cooling region.

Microcellular material production according to the present invention preferably uses a physical blowing agent, that is, an agent that is a gas under ambient conditions. However, chemical blowing agents can be used and can be formulated with polymeric pellets introduced into hopper 44. Suitable chemical blowing agents include those typically relatively low molecular weight organic compounds that decompose at a critical temperature or another condition achievable in extrusion and release a gas or gases such as nitrogen, carbon dioxide, or carbon monoxide. Examples include azo compounds such as azo dicarbonamide.

In embodiments in which a physical blowing agent is used, along barrel 32 of extruder 30 is a port 54 in fluid communication with a source 56 of a physical blowing agent. Any of a wide variety of physical blowing agents known to those of ordinary skill in the art such as hydrocarbons, chlorofluorocarbons, nitrogen, carbon dioxide, and the like, and mixtures, can be used in connection with the invention and, according to a preferred embodiment, source 56 provides carbon dioxide, or nitrogen, or a mixture thereof as a blowing agent. Supercritical fluid blowing agents are preferred, particularly supercritical carbon dioxide and/or nitrogen. Where a supercritical fluid blowing agent is used, a single-phase solution of polymeric material and blowing agent is created having viscosity reduced to the extent that extrusion and blow-molding is readily accomplished even with material of melt flow no more than about 0.2 g/10 min. A pressure and metering device 58 typically is provided between blowing agent source 56 and port 54. Device 58 can be used to meter the blowing agent so as to control the amount of the blowing agent in the polymeric stream within the extruder to maintain a level of blowing agent at a level, according to one set of embodiments, between about 1% and 15% by weight, preferably between about 3% and 12% by weight, more preferably between about 5% and 10% by weight, more preferably still between about 7% and 9% by weight, based on the weight of the polymeric stream and blowing agent. In other embodiments very low levels of blowing agents are suitable, for example less than about 3%, less than about 2%, or less than about 1.5% by weight blowing agent. These blowing agent levels can find use, in some instances, where a nucleating agent is used.

The systems and methods of the invention allow formation of microcellular material without use of a nucleating agent. But such agents can be used and, in some embodiments, polymeric material including a nucleating agent such as talc is blow molded. It has been discovered, in accordance with the invention, that polymeric material including a filler such as talc adds to the ability to make thicker parts at higher pressures, and improves cell structure. Although not wishing to be bound by any theory, it is believed that use of a nucleating agent such as talc reduces the amount of blowing agent such as carbon dioxide or nitrogen needed, thus the material will have a higher viscosity (since carbon dioxide or nitrogen reduces viscosity in such material). Therefore, the size of nucleating pathways and exit gaps can be increased while maintaining similar extrusion conditions otherwise, resulting in thicker parts. In addition, a nucleating agent such as talc adds to the viscosity of molten polymeric material inherently, allowing formation of thicker parts. In this embodiment of the invention nucleating agent such as talc can be added in an amount of at least 1%, or 2%, or 4%, 5.5% or even 7% or more.

In some embodiments carbon dioxide is used in combination with other blowing agents such as nitrogen, and in other embodiments carbon dioxide is used alone with no other blowing agents present. In other embodiments carbon dioxide can be used with other blowing agents so long as the other blowing agents do not materially alter the blowing process. When nitrogen is used, similarly it can be used alone, in combination with another blowing agent that adds to or changes the blowing agent properties, or in combination with another agent that does not materially change the blowing process.

The pressure and metering device can be connected to a controller (not shown) that also is connected to drive motor 40 and/or a drive mechanism of a gear pump (not shown) to control metering of blowing agent in relationship to flow of polymeric material to very precisely control the weight percent blowing agent in the fluid polymeric mixture.

The described arrangement facilitates a method that is practiced according to several embodiments of the invention, in combination with blow molding. The method involves introducing, into fluid polymeric material flowing at a rate of at least about 10 lbs/hr., a blowing agent that is a gas under ambient conditions and, in a period of less than about 1 minute, creating a single-phase solution of the blowing agent fluid in the polymer. The blowing agent fluid is present in the solution in an amount of at least about 2.0% by weight based on the weight of the solution in this arrangement. In preferred embodiments, the rate of flow of the fluid polymeric material is at least about 40 or 60 lbs/hr., more preferably at least about 80 lbs/hr., and in a particularly preferred embodiment greater than at least about 100 lbs/hr., and the blowing agent fluid is added and a single-phase solution formed within one minute with blowing agent present in the solution in an amount of at least about 3% by weight, more preferably at least about 5% by weight, more preferably at least about 7%, and more preferably still at least about 10% (although, as mentioned, in a another set of preferred embodiments lower levels of blowing agent are used). In these arrangements, at least about 2.4 lbs per hour blowing agent, preferably $CO_2$, is introduced into the fluid stream and admixed therein to form a single-phase solution. The rate of introduction of blowing agent is matched with the rate of flow of polymer to achieve the optimum blowing agent concentration.

Although port 54 can be located at any of a variety of locations along the barrel, according to a preferred embodiment it is located just upstream from a mixing section 60 of the screw and at a location 62 of the screw where the screw includes unbroken flights.

Figure 2:
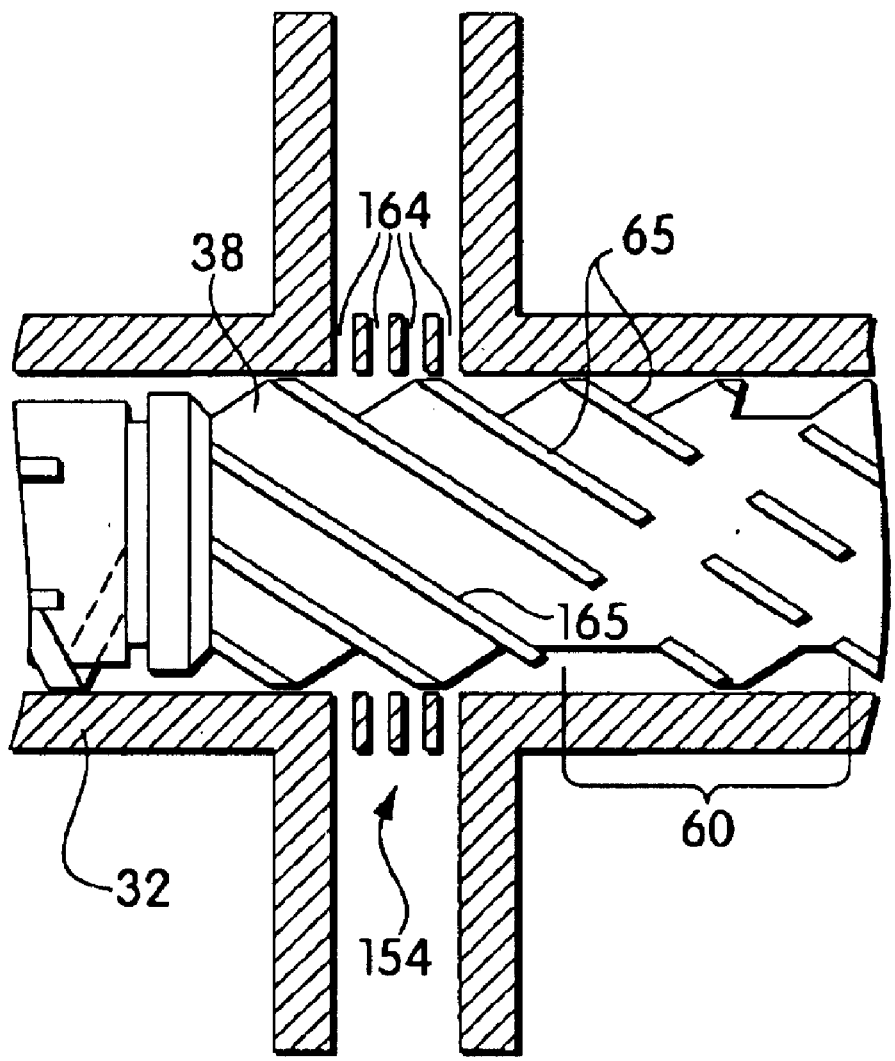
FIG. 2 illustrates a multihole blowing agent feed orifice arrangement and extrusion screw.

Referring now to FIG. 2, a preferred embodiment of the blowing agent port is illustrated in greater detail and, in addition, two ports on opposing top and bottom sides of the barrel are shown. In this preferred embodiment, port 154 is located in the gas injection section of the screw at a region upstream from mixing section 60 of screw 38 (including highly-broken flights) at a distance upstream of the mixing section of no more than about 4 full flights, preferably no more than about 2 full flights, or no more than 1 full flight. Positioned as such, injected blowing agent is very rapidly and evenly mixed into a fluid polymeric stream to promote production of a single-phase solution of the foamed material precursor and the blowing agent.

Port 154, in the preferred embodiment illustrated, is a multi-hole port including a plurality of orifices 164 connecting the blowing agent source with the extruder barrel. As shown, in preferred embodiments a plurality of ports 154 are provided about the extruder barrel at various positions radially and can be in alignment longitudinally with each other. For example, a plurality of ports 154 can be placed at the 12 o'clock, 3 o'clock, 6 o'clock, and 9 o'clock positions about the extruder barrel, each including multiple orifices 164. In this manner, where each orifice 164 is considered a blowing agent orifice, the invention includes extrusion apparatus having at least about 10, preferably at least about 40, more preferably at least about 100, more preferably at least about 300, more preferably at least about 500, and more preferably still at least about 700 blowing agent orifices in fluid communication with the extruder barrel, fluidly connecting the barrel with a source of blowing agent.

Also in preferred embodiments is an arrangement (as shown in FIG. 2) in which the blowing agent orifice or orifices are positioned along the extruder barrel at a location where, when a preferred screw is mounted in the barrel, the orifice or orifices are adjacent full, unbroken flights 165. In this manner, as the screw rotates, each flight, passes, or "wipes" each orifice periodically. This wiping increases rapid mixing of blowing agent and fluid foamed material precursor by, in one embodiment, essentially rapidly opening and closing each orifice by periodically blocking each orifice, when the flight is large enough relative to the orifice to completely block the orifice when in alignment therewith. The result is a distribution of relatively finely-divided, isolated regions of blowing agent in the fluid polymeric material immediately upon injection and prior to any mixing. In this arrangement, at a standard screw revolution speed of about 30 rpm, each orifice is passed by a flight at a rate of at least about 0.5 passes per second, more preferably at least about 1 pass per second, more preferably at least about 1.5 passes per second, and more preferably still at least about 2 passes per second. In preferred embodiments, orifices 154 are positioned at a distance of from about 15 to about 30 barrel diameters from the beginning of the screw (at upstream end 34).

Figure 3:
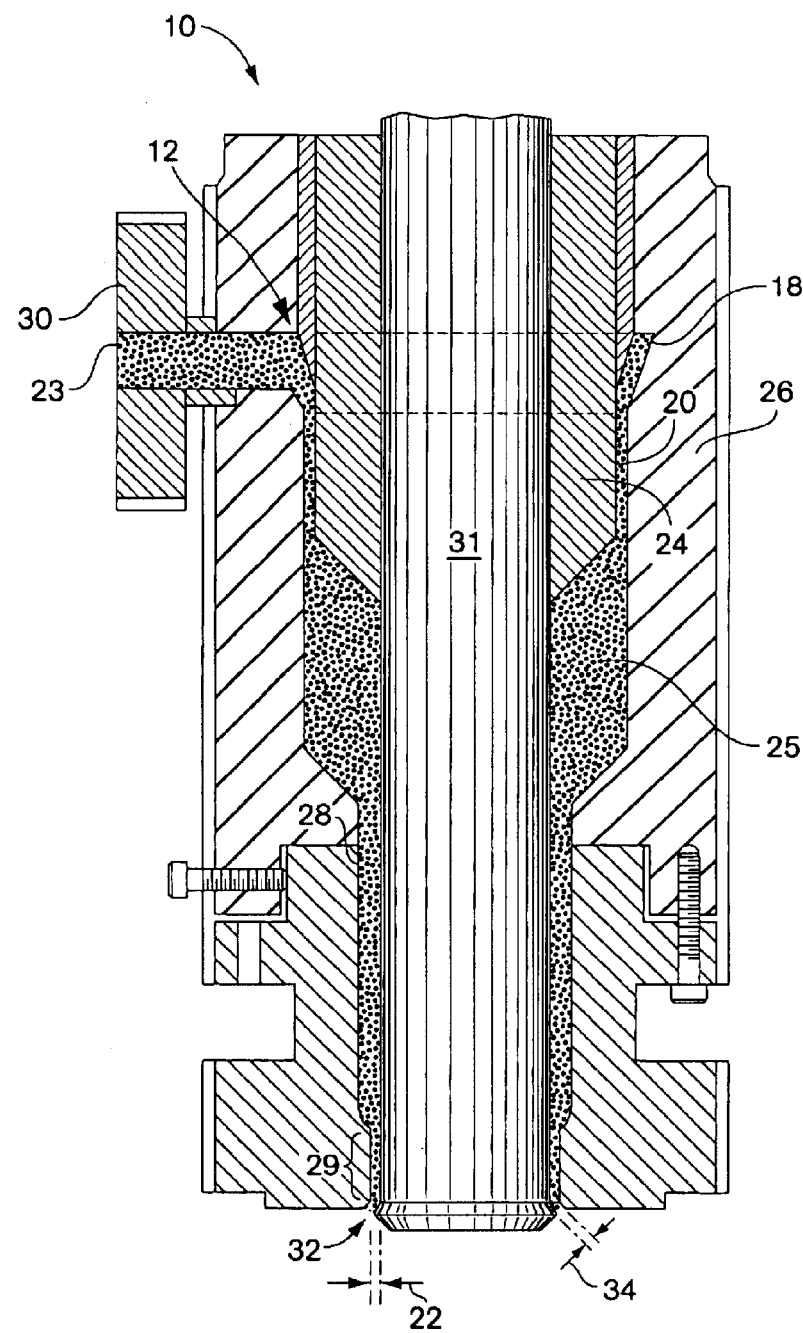
FIG. 3 is a schematic illustration of a die for the injection blow molding system of FIG. 1.

Referring now to FIG. 3, a die 10 of the invention is illustrated schematically in cross-section and includes an annular outer die body 26 surrounding an inner die body 24 which, in turn, surrounds an inner mandrel 31. The die includes a fluid inlet 12, constructed and arranged to receive a single-phase, homogeneous solution of polymeric fluid and blowing agent that is a gas under ambient conditions, defined by the junction of the outlet of extruder 30 and a sidewall entrance of the die. Fluid inlet 12 communicates with an annular ring-like void 18 between the outer die body and inner die body that is in fluid communication with an annular channel 20 defined as a gap between the inner die body 24 and outer die body 26. Channel 20 fluidly communicates with an annular section 28 of the die that is of greater width than that of channel 20. Section 28 communicates, in turn, with a narrowed annular portion 29 defining a nucleating pathway having a gap 22 that is of a dimension that creates a rapid pressure drop facilitating nucleation of the single-phase solution fed to the die. At its downstream end nucleating pathway 29 fluidly communicates with an exit 32 of the die having a gap 34. Nucleating pathway 29, as illustrated, has an essentially constant cross-sectional dimension along its length. The pathway can change in cross-sectional dimension along its length as well, for example decreasing in cross-sectional dimension in a downstream direction for particularly high pressure drop rates, as disclosed in U.S. patent application Ser. No. 08/777,709 and International patent application serial no. PCT/US97/15088, referenced above. Where the pathway decreases in cross-sectional dimension in a downstream direction, a single-phase solution can be continuously nucleated by experiencing continuously decreasing pressure within successive, continuous portions of the flowing, single-phase stream at a rate which increases.

Die 10 is constructed such that inner die body 24 can move axially relative to outer die body 26. Inner die body 24 can move from an upstream position as illustrated in FIG. 3 to a downstream position in which it almost fills a region indicated as 25. Thus, when inner die body 24 is positioned in an upstream position as illustrated in FIG. 3, region 25 defines an accumulator.

In operation, a single-phase solution 23 of polymeric material and blowing agent is fed from extruder 30 to the die 10, first into annular ring 18, then through channel 20, accumulator 25 (to the extent that inner die body 24 is positioned upstream) and section 28 of the die as a single-phase, non-nucleated solution, is nucleated through a rapid pressure drop occurring at nucleating pathway 29, and is extruded at exit 32 as a parison suitable for blow molding. When it is desired to use the accumulating feature of die 10, exit 32 can be closed (described below) and nonnucleated, single-phase solution 23 of polymeric material and blowing agent can be fed from extruder 30 into accumulator 25 while inner die body 24 moves in an upstream direction. A load can be applied to inner die body 24 in a downstream direction, during this procedure, to maintain in accumulator 25 an essentially constant pressure that maintains the polymer/blowing agent solution in a non-nucleated, single-phase condition. Then, exit 32 can be opened and inner die body 24 driven in a downstream direction to nucleate and extrude a microcellular parison. This feature allows for an extruder to be run continuously while parison extrusion occurs periodically.

While polymeric material nucleated in nucleating pathway 29 can include nucleating agent in some embodiments, in other embodiments no nucleating agent is used. In either case, the pathway is constructed so as to be able to create sites of nucleation in the absence of nucleating agent whether or not nucleating agent is present. In particular, the nucleating pathway has dimensions creating a desired pressure drop rate through the pathway. In one set of embodiments, the pressure drop rate is relatively high, and a wide range of pressure drop rates are achievable. A pressure drop rate can be created, through the pathway, of at least about 0.1 GPa/sec in molten polymeric material admixed homogeneously with about 6 wt % $CO_2$ passing through the pathway of a rate of about 40 pounds fluid per hour. Preferably, the dimensions create a pressure drop rate through the pathway of at least about 0.3 GPa/sec under these conditions, more preferably at least about 1 GPa/sec, more preferably at least about 3 GPa/sec, more preferably at least about 5 GPa/sec, and more preferably still at least about 7,10, or 15 GPa/sec. The nucleator is constructed and arranged to subject the flowing stream to a pressure drop at a rate sufficient to create sites of nucleation at a density of at least about $10^7$ or, preferably, $10^8$ sights/cm$^3$. The apparatus is constructed and arranged to continuously nucleate a fluid stream of single-phase solution of polymeric material and flowing agent flowing at a rate of at least 20 lbs/hour, preferably at least about 40 lbs/hour, more preferably at least about 60 lbs/hour, more preferably at least about 80 lbs/hour, and more preferably still at least about 100, 200, or 400 lbs/hour.

Die 10 is constructed such that mandrel 31 can move axially relative to the remainder of the die. This allows for exit 32 to be closed, if desired, by moving mandrel 31 in an upstream direction so as to seal the inner die lip against the outer die lip.

Figure 4:
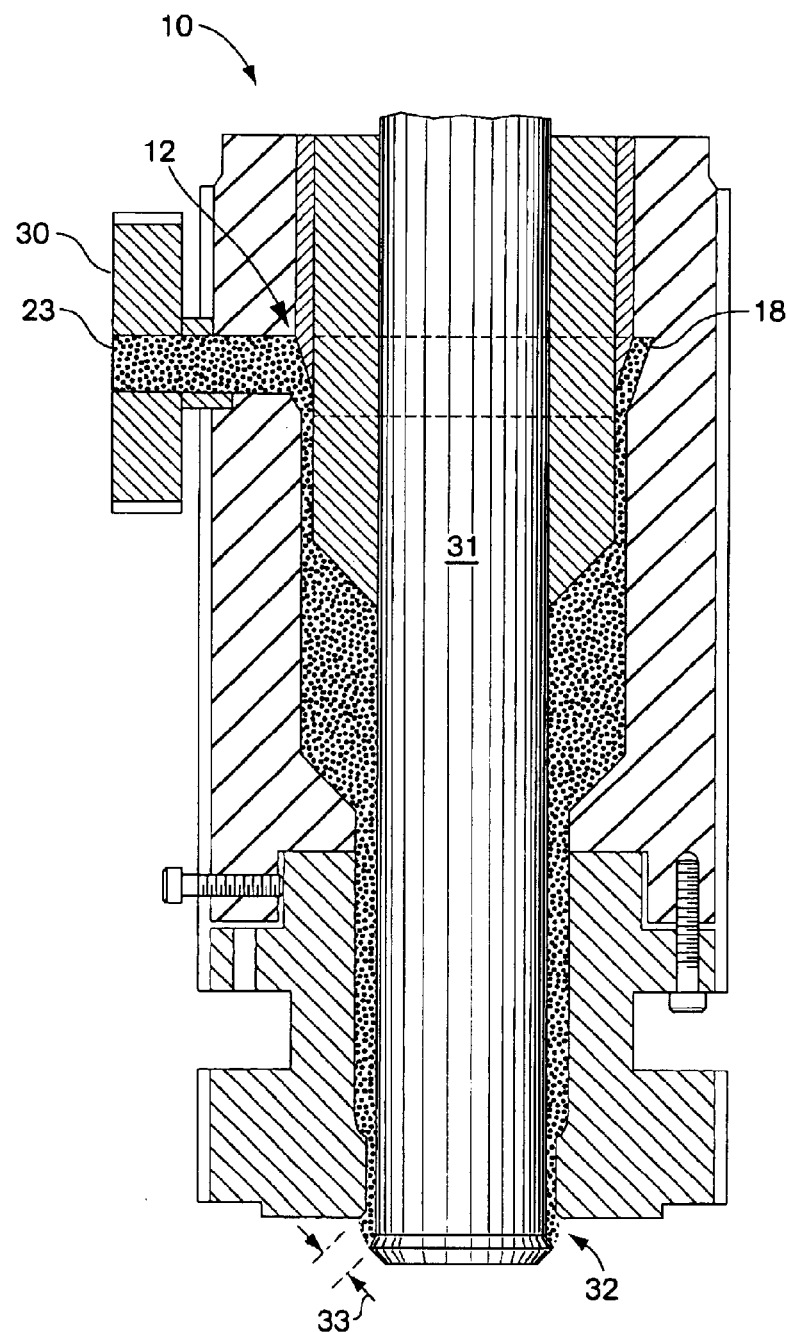
FIG. 4 is a schematic illustration of the die of FIG. 1, adjusted to extrude relatively thicker microcellular material.

Referring now to FIG. 4, die 10 is illustrated with mandrel 31 extended distally such that exit 32 includes a gap 33 that is significantly widened relative to gap 34 as illustrated in FIG. 3. This can be effected while maintaining a constant gap 22 in nucleating section 29 of the die. Thus, nucleation of the single-phase polymer/blowing agent fluid stream takes place at a constant pressure drop rate while the die can produce a parison that varies in thickness. A controller actuates the mandrel such that exit 32 widens and narrows to produce a parison having varied thickness as desired. A microcellular product varying in thickness in a machine direction while having essentially uniform microcellular structure as is produced using die 10 are described above.

The invention also allows co-extrusion of foam or microcellular foam articles. Although a die for extrusion of such an article with two or more layers is not illustrated, it can be clearly understood with reference to FIG. 3. A multi-layer extrusion die, in one embodiment, includes co-axial, separate, pathways defining nucleating sections that feed together into a single exit 32. That is, the die includes a nucleating section 29 as illustrated in FIG. 3, and an additional nucleating section spaced radially outwardly from nucleating section 29 and fed by a separate section similar to section 28. Simultaneous, separate nucleation of separate layers is followed by joining of the nucleated layers slightly before or at gap 32 where combination of the layers and shaping and ejection of the layers takes place.

According to another aspect of the invention a microcellular polymeric parison is extruded that differs in material density along its length. In this embodiment the parison can differ in thickness along its length, as well. This can be accomplished using the system illustrated in FIG. 5 in which the die portion of an extruder 70 is provided that is similar to extruder 30 of FIG. 1. Die portion of extruder 70 need not necessarily include a mandrel that is movable axially during extrusion to produce a parison of varying thickness, but includes an air ring 52 for subjecting the parison, during extrusion, to varying conditions of cooling. The air ring can subject different portions of the parison to different cooling conditions, thus reducing cell growth in certain portions of the parison relative to other portions. In a similar manner, selected sections of the internal surface of the parison can be cooled by passing air through a channel 60 formed in mandrel 31 between an inner mandrel part 61 and an outer mandrel part 62. Internal air cooling can be used alternately or in conjunction with external air cooling via air ring 52. The resulting parison can be blow molded and can be created such that some sections are relatively higher in material density than others. Sections subjected to different cooling immediately post-extrusion experience different cell growth and therefore different density.

Figure 5:
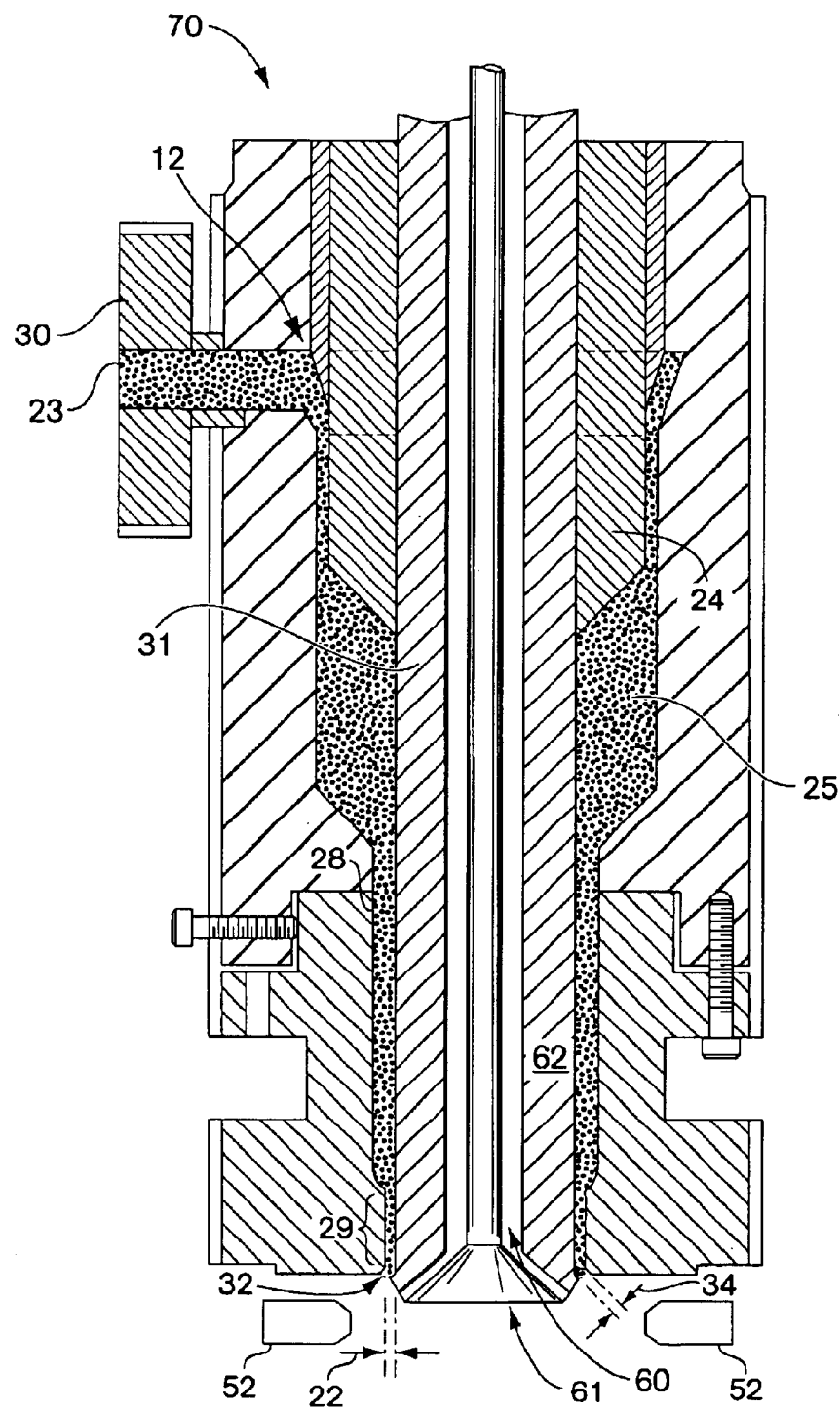
FIG. 5 is a schematic illustration of another embodiment of the die of FIG. 1.

The system of FIG. 5 can be used also to produce a blow-molded article having increased density at locations where greater strength is required. For example, in a plastic beverage container including a threaded mouth for receiving a screw-on cap, the threaded mouth might desirably be made of higher material density for added strength than the remainder of the bottle.

It is one feature of the present invention that the microcellular extruded parison of the invention is better able to withstand blowing conditions than many prior art foam parisons. This is because of the greater resistance of smaller cells the pressure exerted during blowing. Many prior art foams will exhibit cell collapse when exposed to blow molding conditions. However, as cell size decreases, greater pressure is required to cause cell collapse.

In one embodiment of the invention, a microcellular parison is co-extruded with an auxiliary polymeric layer that can be internal of or external of the microcellular parison, or both. The auxiliary material can be foam or non-foam and can be added to create a particular appearance (for example when a colored article is desired, a microcellular foam core can be covered with a colored, co-extruded layer). Also, a co-extruded layer may be added to provide good printability on an article or to provide a particular surface texture. Other characteristics such as chemical compatibility, and the like are contemplated. In some cases, a co-extruded layer may be used, internally or externally of a microcellular parison core, to isolate the core from internal contents of the article, or external environment. This can be useful to increase the use of recycled material in the core. The auxiliary, co-extruded layer, in preferred embodiments, is not necessary for structural support. That is, the microcellular parison could be blow-molded and would provide adequate structural support on its own, and the co-extruded layer is for purposes of surface modification only. In one embodiment, an auxiliary non-foam, non-structurally-supporting layer is provided adjacent the foam article. This layer can be designed for specific barrier properties (for example, for compatibility with material to be contained in the article, Federal regulation requirements, etc.).

The production of blow-molded microcellular polymeric articles in accordance with the invention is surprising since desirable characteristics for polymers for blow molding are different from those characteristics desired in typical extrusion processes. For blow molding, typically high-molecular-weight, high-viscosity polymers are needed to withstand, successfully, blow molding conditions. In contrast, in standard extrusion it is desirable to use lower-molecular weight, lower-viscosity polymers for high throughput. Thus, extrusion blow molding includes an inherent dichotomy that adds even more complication when foams are used. For controlled foaming, higher-molecular weight, higher-viscosity polymers are favored to prevent uncontrolled foaming resulting in open-celled material.

The present invention provides successful high-throughput microcellular polymeric extrusion blow molding since higher-molecular weight polymers can be used while reducing viscosity via supercritical fluid blowing agent incorporation. Relatively high molecular weight polymers are reduced in viscosity via the supercritical fluid blowing agent for high-throughput extrusion, yet at extrusion and gasification of the blowing agent the high-molecular weight polymer provides the strength needed for well-controlled microcellular foaming. Therefore, as noted above, extrusion and blow molding of foam polymeric material, preferably microcellular foam polymeric material, can be accomplished with material of melt flow of no more than about 0.2 g/10 min, preferably no more than about 0.12 g/10 min, more preferably no more than about 0.1 g/10 min.

The function and advantage of these and other embodiments of the present invention will be more fully understood from the examples below. The following examples are intended to illustrate the benefits of the present invention, but do not exemplify the full scope of the invention.

EXAMPLE 1—System

A tandem extrusion line including a 2½ mm 32:1 L/D single screw primary extruder (Akron Extruders, Canal Fulton, Ohio) and a 3 36:1 L/D single screw secondary extruder (Akron Extruders, Canal Fulton, Ohio) was arranged in a right angle configuration. A volumetric feeder capable of supplying up to 30 lb/hr was mounted in the feed throat of the primary extruder such that compounded talc additive pellets could be metered into the primary extruder. An injection system for the injection of $CO_2$ into the secondary was placed at approximately 8 diameters from the inlet to the secondary. The injection system included 4 equally spaced circumferential, radially-positioned ports, each port including 176 orifices, each orifice of 0.02 inch diameter, for a total of 704 orifices. The injection system included an air actuated control valve to precisely meter a mass flow rate of blowing agent at rates from 0.2 to 12 lbs/hr at pressures up to 5500 psi.

The screw of the primary extruder was specially designed screw to provide feeding, melting and mixing of the polymer/talc concentrate followed by a mixing section for the dispersion of blowing agent in the polymer. The outlet of this primary extruder was connected to the inlet of the secondary extruder using a transfer pipe of about 24 inches in length.

The secondary extruder was equipped with specially designed deep channel, multi-flighted screw design to cool the polymer and maintain the pressure profile of the microcellular material precursor, between injection of blowing agent and entrance to a gear pump (LCI Corporation, Charlotte, N.C.) attached to the exit of the secondary. The gear pump was equipped with an integral jacket for heating/cooling and sized to operate at a maximum output of 250 lb/hr with a rated maximum discharge pressure of 10,000 psi.

The system was equipped, at exit from the gear pump, with a die adapter and a vertically mounted blow molding die (Magic Company, Monza, Italy). The die adapter was equipped with taps for measurement of melt temperature and pressure just prior to entry into the die. The blow molding head included a conventional spider type flow distribution channel and a die adjustment system that allowed movement of the die relative to the fixed position tip providing a variety of exit gaps depending on the chosen tooling.

A two-piece bottle mold was mounted in a fixture for the hand molding of sample bottles as a secondary process. One half of the mold was mounted stationary in the fixture with the other half mounted on linear slides. Quick acting clamps mounted on the stationery half of the mold provided the mechanism to clap the mold shut. A short section of steel tubing sharpened to a point attached to a 0–50 psi regulator using a length of flexible hose provided the blow system. Mold diameter varied from approximately 1 inch in the cap area to 2 to 3 inches in the body of the bottle. The overall cavity length of the bottle mold was approximately 10 inches.

EXAMPLE 2

Parison and Bottle Formation

High density polyethylene (Equistar LR 5403) pellets were introduced into the main hopper of extrusion line described in example 1 and a precompounded talc concentrate (50% talc in a HDPE base) was introduced in the additive feeder hopper. The tooling attached to the blow molding head included a die with a 0.663 inch exit diameter and 6.2° taper angle and a tip of 0.633 inch exit diameter and 2° taper angle. The combination of this tip and die provides an 8.2° included convergence angle.

The extruder and gear pump rpm were adjusted to provide an output of approximately 210 lb/hr at speeds of approximately 78 rpm on the primary, 32 rpm on the secondary and 50 rpm of the gear pump. Secondary barrel temperatures were set to maintain a melt temperature of approximately 315° F. at entrance to the die. The additive feeder was set to provide an output of approximately 11 lb/hr resulting in a 2.7% by polymer weight talc in the material. $CO_2$ blowing agent was injected at a nominal rate of 3.3 lb/hr resulting in a 1.6% by polymer weight blowing agent in the material.

The above conditions produced a parison that was 0.045 inch thick by approximately 1.3 inches in diameter at a density of 0.74 gm/cc. Based on a nominal solid material density of 0.95 gm/cc, the achieved density reduction is 23%.

Sample bottles were produced in the following manner: A parison of approximately 16 inches in length was extruded, manually removed from the extruder and immediately positioned in the mold. The mold halves were quickly closed and clamped. With the air regulator set to 20 psi, the sharpened tube was then used to pierce the parison at the top of the mold and introduce the air into the ID of the parison now closed at end of the mold.

The above conditions produced a bottle of 0.015 inch thick by approximately 2.5 inches in diameter at a density of 0.70 gm/cc.

EXAMPLE 3

Parison and Bottle Formation

High density polyethylene (Equistar LR 5403) pellets were introduced into the main hopper of an extrusion line described in example 1 and a precompounded talc concentrate (50% talc in a HDPE base) was introduced in the additive feeder hopper. The tooling attached to the blow molding head included a die with a 0.675 exit diameter and 4.0° taper angle and a tip of 0.633 exit diameter and 2° taper angle. The combination of this tip and die provided a 6.0° included convergence angle.

The extruder and gear pump rpm were adjusted to provide an output of approximately 180 lb/hr at speeds of approximately 66 rpm on the primary, 30 rpm on the secondary and 40 rpm of the gear pump. Secondary barrel temperatures were set to maintain a melt temperature of approximately 310° F. at entrance to the die. The additive feeder was set to provide an output of approximately 18 lb/hr resulting in a 5.3% by polymer weight talc in the material. $N_2$ blowing agent was injected at a nominal rate of 0.6 lb/hr resulting in a 0.33% by polymer weight blowing agent in the material.

The above conditions produced a parison that was 0.080 inch thick by approximately 1.2 inches in diameter at a density of 0.69 gm/cc. Based on a nominal solid material density of 0.95 gm/cc, the achieved density reduction is 29%.

Sample bottles were produced in the following manner: A parison of approximately 16 inches in length was extruded, manually removed from the extruder and immediately positioned in the mold. The mold halves were quickly closed and clamped. With the air regulator set to 40 psi, the sharpened tube was then used to pierce the parison at the top of the mold and introduce the air into the ID of the parison now closed at end of the mold.

The above conditions produced a bottle of 0.037 inch thick by approximately 2.0 inches in diameter at a density of 0.79 gm/cc.

Those skilled in the art would readily appreciate that all parameters listed herein are meant to be exemplary and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

What is claimed is:

1. A method comprising:
   extruding a microcellular parison suitable for blow molding from an extruder die while varying the thickness of the parison; and
   blow molding the parison to form a microcellular, blow-molded article.

2. A method as in claim 1, comprising providing a single-phase, non-nucleated solution of polymeric material and a blowing agent that is a gas under ambient conditions, nucleating the single-phase solution by subjecting the solution to a high pressure drop rate, and extruding a microcellular parison that is a product of the single-phase solution.

3. A method as in claim 1, wherein the article has a void volume of at least about 10%.

4. A method as in claim 1, further comprising establishing a stream of a fluid, single-phase non-nucleated solution of a precursor of microcellular material and a blowing agent, continuously nucleating the solution to form a nucleated polymeric fluid, and extruding the microcellular parison from the nucleated polymeric fluid.

5. A method as in claim 4, the step of continuously nucleating involving creating sites of nucleation of the blowing agent in the stream by subjecting the stream to conditions of solubility change sufficient to create sites of nucleation in the solution in the absence of an auxiliary nucleating agent.

6. A method as in claim 1, further comprising establishing a stream of a fluid, single-phase non-nucleated solution of a precursor of microcellular material and a supercritical fluid blowing agent prior to extruding the microcellular parison.

7. A method as in claim 4, involving creating sites of nucleation by subjecting the stream to a pressure drop at a pressure drop rate sufficient to create sites of nucleation.

8. A method as in claim 7, involving subjecting the stream to a pressure drop at a pressure drop rate sufficient to create sites of nucleation at a density of at least about $10^7$ sites/cm$^3$.

9. A method as in claim 7, involving subjecting the stream to a pressure drop at a pressure drop rate of at least about 0.3 GPa/sec to create sites of nucleation.

10. A method as in claim 1, comprising extruding the microcellular parison into ambient conditions from an extruder die while varying the thickness of the parison.

11. A method as in claim 1, further comprising establishing the stream of fluid, single-phase non-nucleated solution of a precursor of microcellular material and a blowing agent by introducing, into fluid polymeric material flowing at a rate of at least about 10 lbs./hr, a fluid that is a gas under ambient conditions and, in a period of less than about one minute, creating a single-phase solution of the fluid and the polymer, the fluid present in the solution in an amount of at least about 2% by weight based on the weight of the solution.

12. A method as in claim 11, further comprising continuously nucleating the solution by continuously decreasing the pressure within successive, continuous portions of the flowing, single-phase stream at a rate which increases.

13. A method as in claim 11, wherein the concentration of the blowing agent in the homogeneous single-phase non-nucleated solution is at least about 5 percent, by weight, of the solution.

14. A method as in claim 11, wherein the concentration of the blowing agent in the homogeneous single-phase non-nucleated solution is at least about 7 percent, by weight, of the solution.

15. A method as in claim 11, wherein the concentration of the blowing agent in the homogeneous single-phase non-nucleated solution is at least about 10 percent, by weight, of the solution.

16. A method as in claim 11, wherein the blowing agent is supercritical carbon dioxide.

17. A method comprising:
   providing an extruded polymeric microcellular foam parison; and
   subjecting the parison to blow molding conditions.

18. A method as in claim 17, the subjecting step comprising applying pressure of at least about 1.5 bar internal of the parison.

19. A method as in claim 18, comprising applying pressure of at least about 3 bar internal of the parison.

20. A method as in 18, comprising applying pressure of at least about 5 bar internal of the parison.

21. A method as in 18, comprising applying pressure of at least 10 bar internal of the parison.

22. A method as in claim 17, further comprising forming a blow-molded article that is essentially free of a supporting, non-foam structure, the article being essentially closed cell, having a wall thickness of less than about 0.075 inch.

23. A method as in claim 17, comprising continuously extruding the polymeric microcellular foam parison and continuously subjecting the parison to blow molding conditions.

24. A method as in claim 17, comprising:
providing an extruded polymeric foam parison having a first portion and a second portion spaced from the first portion in the parison machine direction, the first portion and the second portion differing in thickness by a factor of at least about 1.1; and
subjecting the parison to blow molding conditions.

25. A method as in claim 24, the first portion and the second portion differing in thickness by a factor of at least about 1.3.

26. A method as in claim 24, the first portion and the second portion differing in thickness by a factor of at least about 1.5.

27. A method as in claim 24, the first portion and the second portion differing in thickness by a factor of at least about 1.7.

28. A method as in claim 24, comprising:
providing an extruded polymeric foam parison having a first portion and a second portion spaced from the first portion in the parison machine direction, the first portion and the second portion differing in material density by a factor of at least about 1.1; and
subjecting the parison to blow molding conditions.

29. A method as in claim 24, comprising:
providing an extruded parison of polymeric material of melt flow no more than about 0.2 g/10 min; and
subjecting the parison to blow molding conditions.

30. A method comprising:
providing a polymeric microcellular foam parison; and
without heating the parison subjecting the parison to blow molding conditions.

31. A method as in claim 30, wherein the parison is an extruded polymeric microcellular foam parison.

32. A method as in claim 17, further comprising conveying polymeric material in a downstream direction in an extruder.

33. A method as in claim 32, further comprising introducing a blowing agent into the polymeric material in the extruder to form a mixture of blowing agent and polymeric material.

34. A method as in claim 33, wherein the blowing agent is a physical blowing agent.

35. A method as in claim 34, wherein the blowing agent comprises carbon dioxide or nitrogen.

36. A method as in claim 33, wherein the blowing agent is introduced through multiple orifices into the polymeric material in the extruder.

37. A method as in claim 33, further comprising mixing the mixture of blowing agent and polymeric material to form a single-phase solution.

38. A method as in claim 37, further comprising extruding the single-phase solution to form the extruded polymeric microcellular foam parison.

39. A method as in claim 38, further comprising nucleating the single-phase solution in a nucleating pathway while extruding the single-phase solution.

40. A method as in claim 39, comprising nucleating the single-phase solution at a pressure drop rate of at least about 0.1 GPa/sec.

41. A method as in claim 32, wherein the polymeric material has a melt flow of no more than about 0.2 g/10 minute.

42. A method as in claim 17, comprising subjecting the parison to blow molding conditions to form a microcellular, blow-molded article.

43. A method as in claim 42, wherein the microcellular, blow-molded article has an average cell size of less than about 50 microns.

44. A method as in claim 42, wherein the microcellular, blow-molded article has a maximum cell size of about 100 microns.

45. A method as in claim 42, wherein the microcellular, blow-molded article is a bottle.

46. A method as in claim 42, wherein walls of the microcellular, blow-molded article are formed entirely of microcellular material.

47. A method as in claim 42, wherein the microcellular, blow-molded article includes sections having different void volumes.

48. A method as in claim 42, wherein the microcellular, blow-molded article includes sections having different thicknesses.

49. A method as in claim 42, wherein the microcellular, blow-molded article has a wall thickness of less than about 0.100 inch.

50. A method as in claim 42, wherein the microcellular, blow-molded article has a void volume of at least about 10%.

51. A method as in claim 42, wherein the microcellular, blow-molded article has a void volume of at least about 30%.

52. A method as in claim 42, wherein the microcellular, blow-molded article has a void volume of at least about 50%.

53. A method as in claim 42, wherein the microcellular, blow-molded article is essentially closed-cell.

54. A method as in claim 42, wherein the microcellular, blow-molded article includes at least about 1% by weight nucleating agent.

* * * * *

UNITED STATES PATENT AND TRADEMARK OFFICE
CERTIFICATE OF CORRECTION

PATENT NO. : 6,706,223 B1  
DATED : March 16, 2004  
INVENTOR(S) : Anderson et al.

It is certified that error appears in the above-identified patent and that said Letters Patent is hereby corrected as shown below:

Title page, Item [54] and Column 1, lines 1-3,
Title, change "MICROCELLUAR EXTRUSION/BLOW MOLDING PROCESS AND ARTICLE MADE THEREBY" to -- MICROCELLULAR EXTRUSION/ BLOW MOLDING PROCESS --

Title page,
Item [57], ABSTRACT, delete the first sentence, and insert
-- Microcellular injection blow molding systems and methods may be used to produce microcellular blow molded articles. --

Column 1,
Lines 10-11, under "RELATED APPLICATIONS" delete "is a continuation-in-part of" and insert -- claims priority to --
Line 12, delete "a continuation-in-part of" under "DETAILED DESCRIPTION OF THE INVENTION"

Column 6,
Lines 63 and 65, change "comers" to -- corners --

Signed and Sealed this

Eighteenth Day of January, 2005

JON W. DUDAS  
*Director of the United States Patent and Trademark Office*